United States Patent

Boggs

[11] Patent Number: 5,640,737
[45] Date of Patent: Jun. 24, 1997

[54] MULTI-COMPONENT SPONGE

[75] Inventor: John W. Boggs, Lexington, Ky.

[73] Assignee: Foam Design, Inc., Lexington, Ky.

[21] Appl. No.: 500,574

[22] Filed: Jul. 11, 1995

[51] Int. Cl.$^6$ ............................. A47K 7/02; A47L 13/16
[52] U.S. Cl. .................................. 15/118; 15/244.4
[58] Field of Search ..................... 15/104.93, 104.94, 15/118, 244.1, 244.4

[56] References Cited

U.S. PATENT DOCUMENTS

| | | | |
|---|---|---|---|
| 3,570,036 | 3/1971 | Gilchrist et al. | 15/118 |
| 3,611,468 | 10/1971 | Michael | 15/104.93 |
| 4,240,760 | 12/1980 | Levine | 401/201 |
| 4,866,806 | 9/1989 | Bedford | 15/118 |

*Primary Examiner*—David Scherbel
*Assistant Examiner*—Randall Chin
*Attorney, Agent, or Firm*—Frank C. Leach, Jr.

[57] ABSTRACT

A multi-component sponge has a central or main foam layer of reticulated single cell polyurethane flexible foam and an outer foam layer adhered to each of its two substantially parallel sides so that liquid can flow between the main foam layer and the two outer foam layers. Each of the two outer foam layers is preferably polyurethane flexible foam having a reticulated double cell structure although each could be a reticulated single cell structure having a porosity in the range of 3–110 pores per inch. The main foam layer preferably has a porosity in the range of 3–30 pores per inch. Each of the two outer foam layers is softer than the main foam layer.

17 Claims, 2 Drawing Sheets

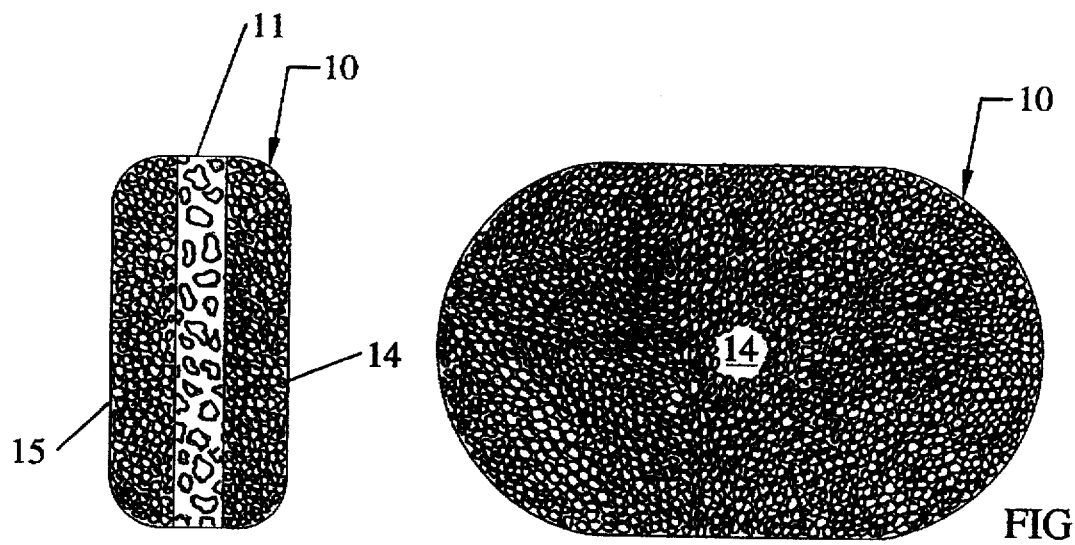
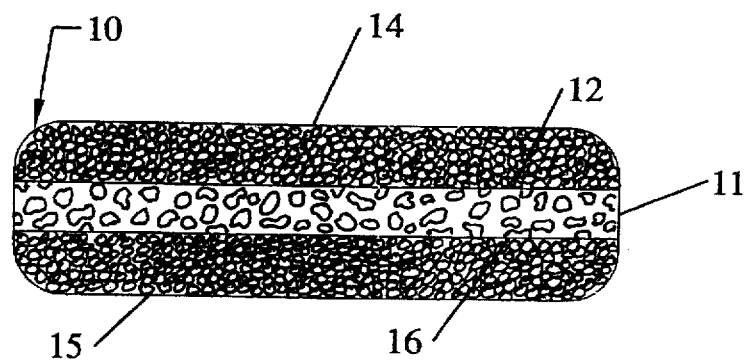
FIG. 3
FIG. 1
FIG. 2

MULTI-COMPONENT SPONGE

This invention relates to a multi-component sponge and, more particularly, a multi-component sponge having increased sudsing or lathering capability.

Various types of multi-component sponges are disclosed in U.S. Pat. Nos. Des. 267,124 to Markarian, Re. 26,937 to Sawyer, 2,030,911 to Borden, 4,196,490 to Jonzon, 4,457,643 to Caniglia, 4,563,103 to Van Overloop et al, 4,665,580 to Morris, 4,866,806 to Bedford, 5,094,559 to Rivera et al, and 5,240,339 to DeForest et al. The sponges of the aforesaid patents may be used for cleaning a human being, as a cleaning or scrubbing pad, or as a body lotion applicator.

It also has been previously suggested to utilize a liquid within a multi-component sponge. The previously suggested multi-component sponge is formed of two foam layers of polyurethane flexible foam with each having a density of about two pounds per cubic foot. One foam layer is a reticulated single cell foam having a porosity of 45–55 pores per inch (number of cell openings per linear inch of surface). The other foam layer is a reticulated double cell foam.

Either foam layer can receive a non-solid soap such as a liquid or a gel, for example. The single cell foam layer is believed to be more porous than the double cell foam layer.

One problem with the previously suggested multi-component sponge in which a liquid soap is added is that the amount of lathering or sudsing is not as great as desired. This is because of the inability to get a sufficient quantity of liquid soap inside of the sponge.

The multi-component sponge of the present invention satisfactorily solves the foregoing problem through providing a main layer of foam material of greater porosity than a layer of an open cell material, preferably foam, adhered thereto. In the preferred embodiment, each of two substantially parallel sides of the main or central foam layer has a foam layer of lesser porosity than the central foam layer adhered thereto.

To increase the quantity of water that it can hold, the central layer of foam material has a relatively large porosity so that a relatively large amount of liquid soap, for example, can be received within the central layer. Because of the relatively large porosity of the central foam layer, its outer exposed surface is made more abrasive than the exposed surfaces of either of the foam layers adhered to the substantially parallel sides of the central foam layer.

This enables the outer foam layers to be used for scrubbing a human being while the sponge still has the capability of having sufficient capacity to hold sufficient liquid soap to produce increased lathering or sudsing. The more abrasive central foam layer may be employed as an exfoliating scrubber to the skin of the user. Therefore, the multi-component sponge of the present invention not only provides additional lathering from the liquid soap but also enables removal of dead skin.

The outer foam layers are adhered to the central foam layer without clogging the cells of any of the foam layers. This allows the liquid soap to flow easily into the outer foam layers from the main or central foam layer.

An object of this invention is to provide a multi-component sponge having improved lathering or sudsing.

Other objects of this invention will be readily perceived from the following description, claims, and drawings.

This invention relates to a multi-component sponge including a first foam layer having a reticulated single cell structure and a second layer adhered to the first foam layer so that liquid can flow between the first foam layer and the second layer, which has an open cell structure. The first foam layer has a porosity in the range of 3–15 pores per inch or is homogenous or has a substantially constant porosity and had a greater porosity than the second layer.

This invention also relates to a multi-component sponge including a first foam layer having a reticulated single cell structure and a pair of substantially parallel sides. The first foam layer has a second layer adhered to one of its sides so that liquid can flow between the first foam layer and the second layer and a third layer adhered to its other side so that liquid can flow between the first foam layer and the third layer. Each of the second layer and the third layer has an open cell structure. The first foam layer has a greater porosity than each of the second layer and the third layer. The first foam layer is homogenous or has a substantially constant porosity or has a porosity in the range of 3–15 pores per inch.

The attached drawings illustrate preferred embodiments of the invention, in which:

FIG. 1 is a top plan view of one form of a multi-component sponge of the present invention;

FIG. 2 is a side elevational view of the sponge of FIG. 1;

FIG. 3 is an end elevational view of the sponge of FIG. 1;

Figure 6:
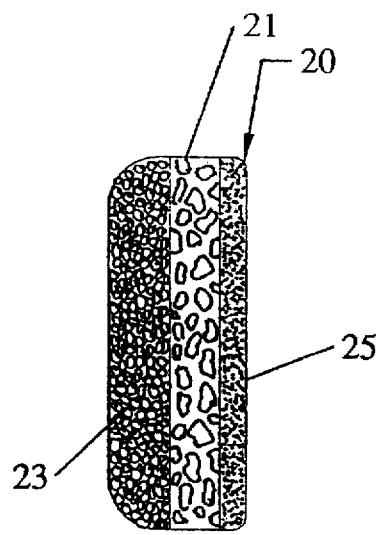
FIG. 6 is an end elevational view of the sponge of FIG. 4.

Referring to the drawings and particularly FIG. 1, there is shown a multi-component sponge 10. The sponge 10 includes a central or middle foam layer 11 (see FIG. 2).

The central or middle foam layer 11 is preferably formed of a reticulated polyurethane flexible foam having a porosity in the range of 3–30 pores per inch and a density in the range of 0.7 to 6 pounds per cubic foot. The preferred range of porosity is 6–10 pores per inch. The preferred density is 1.9 pounds per cubic foot.

The reticulated polyurethane foam may be either polyester or polyether based. The reticulated polyurethane foam has an open single cell structure.

A side 12 of the main or central foam layer 11 has an outer layer 14, preferably foam, adhered thereto. A second outer layer 15, preferably foam, is adhered to a side 16 of the main or central foam layer 11. The sides 12 and 16 are substantially parallel to each other. Each of the outer layers 14 and 15 is adhered to the main or central foam layer 11.

Each of the outer layers 14 and 15 is preferably formed of the same material, the same thickness, and the same porosity. The material of each of the outer layers 14 and 15 is preferably a reticulated polyurethane flexible foam, which can be either polyester or polyether based. The reticulated polyurethane flexible foam can be either single cell or double cell. Thus, the outer layers 14 and 15 can have different cell constructions since it is not necessary for them to be the same.

When the outer layers 14 and 15 have a single cell foam structure, the porosity is in a range from 3 pores per inch to 110 pores per inch and preferably between 45 and 50 pores per inch. While the outer layers 14 and 15 can be made of a double cell open foam structure that is not reticulated, a reticulated double cell foam structure is preferred.

It is believed that the minimum porosity of the central foam layer 11 is about 30 pores per inch. When the size of the porosity decreases below this value, the ability to have the liquid soap transfer to the outer layers 14 and 15 diminishes to not be satisfactory.

The density of each of the outer layers 14 and 15, when formed of polyurethane foam, is in a range of 0.7 to 6 pounds per cubic foot. The preferred density of each of the outer foam layers 14 and 15 is 1.9 pounds per cubic foot.

When forming the sponge 10, it is desired that the layers 11, 14, and 15 be bonded together so that a bonded adhesive will not form a solid layer between the adjacent surfaces of the layers 11 and 14 and the layers 11 and 15. This solid layer would prevent the desired liquid flow between the layers 11, 14, and 15.

Each of the layers 11, 14, and 15 preferably is formed from a relatively large sheet of foam from which a number of the layers 11, 14, and 15 are cut after the relatively large foam sheets have an adhesive applied thereto and a selected pressure has been applied to the adhesive adhered foam sheets for a predetermined period of time. Each of the relatively large foam sheets has the adhesive applied separately thereto.

The sponges 10 are preferably manufactured through initially cutting a double cell foam bun of polyurethane sheet, which forms each of the two foam layers 14 and 15, into a plurality of sheets of a specific thickness with a horizontal saw. A single cell foam bun of polyurethane sheet, which forms the main or central foam layer 11, also is cut by the horizontal saw into a plurality of sheets of a specific thickness, which preferably is the same as the sheets forming each of the two foam layers 14 and 15. Preferably, an urethane adhesive, which is purchased from Pierce and Stevens Inc., Pimberton, Pa. as model No. J9750AE and requires special spray equipment for application, is employed. The adhesive is sprayed on the sheets from which the outer foam layers 14 and 15 are formed and the sheet from which the main or central foam layer 11 is formed. The adhesive is applied to both surfaces of each of the sheets from which the adjacent foam layer 11 is formed, and one surface of each of the two sheets from which the two foam layers 14 and 15 are formed.

The adhesive has an optical brightener. After the adhesive is applied to a surface of one of the foam sheets, a light, which is responsive to the presence of the optical brightener in a quantity sufficient to indicate that the desired amount of adhesive has been applied, is directed to each surface of each sheet to which the adhesive has been applied. If sufficient adhesive has been applied, the optical brightener will be visually viewable when the light shines on the surface having the adhesive.

If sufficient adhesive has been applied, moisture is next added to the adhesive on the sheet to cure the adhesive. When each group of the three sheets forming the foam layers 11, 14, and 15 of each of the sponges 10 have been glued together by the adhesive, each group of the three adhered sheets forming a plurality of the sponges 10 is stacked placed on a pallet. A plurality of the groups of the three adhered sheets is stacked on the pallet.

Ratchet straps extend upwardly from the bottom of the pallet to which they are connected. The ratchet straps are attached directly or indirectly to a flat board on top of the flat sheets from which the sponges 10 are to be formed.

The ratchet straps extend over the exposed surfaces of the sheets. The ratchet straps maintain a desired pressure on the sheets from which the foam layers 11, 14, and 15 are to be formed for at least 24 hours.

Next, the stacked sheets are disposed in a machine in which the edges of the sheets are trimmed by a vertical saw. Then, the sheets are cut by the vertical saw into strips having the desired width of the sponges 10. The strips are then cut by the vertical saw to a predetermined length equal to a predetermined number of the sponges 10 in each of the strips.

Four of the strips are next placed in four substantially parallel tracks in another machine where each of the four strips is cut to a length equal to the length of one of the sponges 10. Last, each of these four sponges 10 is ground by four grinders, one for each of the sponges 10, into the final desired shape of the sponge 10.

Figure 4:
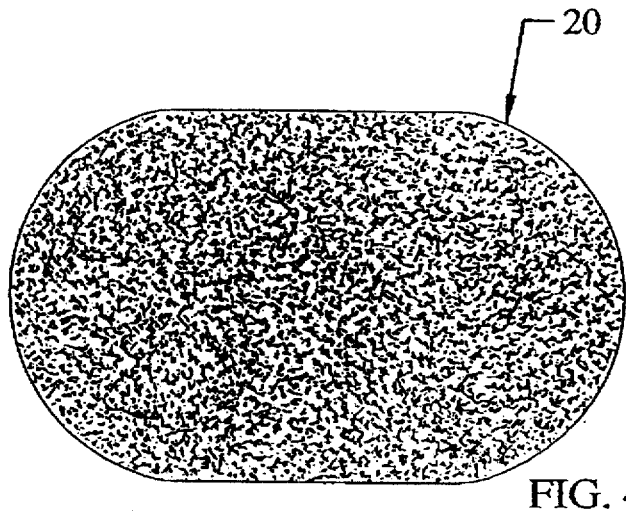
FIG. 4 is a top plan view of another embodiment of a multi-component sponge of the present invention.
Figure 5:
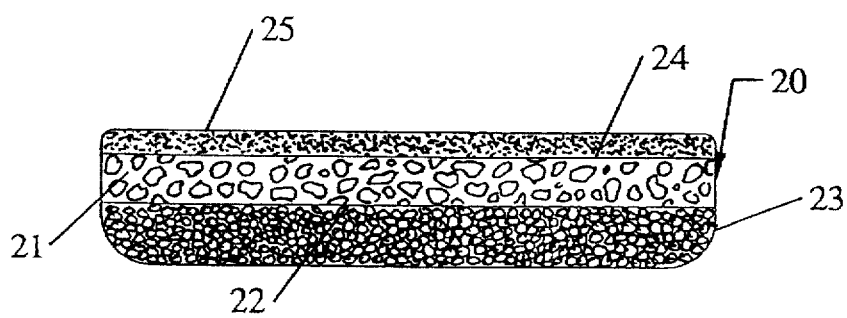
FIG. 5 is a side elevational view of the sponge of FIG. 4.

Referring to the drawings and particularly FIG. 4, there is shown a multi-component sponge 20. The sponge 20 includes a first or main foam layer 21 (see FIG. 5), which is preferably the same as the main foam layer 11 (see FIG. 2) of the sponge 10.

A side 22 (see FIG. 5) of the first foam layer 21 has an outer layer 23, preferably foam, of open cell material adhered thereto by the same adhesive as used in forming the multi-component sponge 10 (see FIG. 2). The outer layer 23 (see FIG. 5) is preferably the same as the second outer layer 14 (see FIG. 2) of the sponge 10.

A side 24 (see FIG. 5), which is substantially parallel to the side 22, of the first foam layer 21 of the sponge 20 has a closed cell polyethylene sheet 25 adhered thereto. The closed cell polyethylene sheet 25 prevents any of the liquid soap from escaping through the side 24 of the first foam layer 21. Thus, the liquid soap flows only from the first foam layer 21 into the second outer layer 23 to provide sufficient liquid soap for increased lathering or sudsing in comparison with the previously suggested multi-component sponge.

It should be understood that the sponge 20 could be formed without the closed cell polyethylene sheet 25 but it would not be as efficient.

It also should be understood that the layers 14 (see FIG. 2), 15, and 23 (see FIG. 5), could be formed of non-foam materials having an open cell structure such as cellulose, for example.

An advantage of this invention is that the multi-component sponge produces more effective lathering or sudsing of a liquid or gel soap contained therein. Another advantage of this invention is that the multi-component sponge can be manufactured without clogging of any of the cells so that liquid or gel may be easily transmitted from the main or central foam layer to each of the outer layers or to the single outer layer.

For purposes of exemplification, particular embodiments of the invention have been shown and described according to the best present understanding thereof, However, it will be apparent that changes and modifications in the arrangement and construction of the parts thereof may be resorted to without departing from the spirit and scope of the invention.

I claim:

1. A multi-component sponge including:
   a first foam layer having a reticulated single cell structure;
   a second layer adhered to said first foam layer so that liquid can flow between said first foam layer and said second layer;
   said second layer having an open cell structure;
   and said first foam layer having a porosity in the range of 3–15 pores per inch and a greater porosity than said second layer.

2. The sponge according to claim 1 in which said first foam layer has a porosity in the range of 6–10 pores per inch.

3. The sponge according to claim 2 in which said second layer has a reticulated double cell foam structure.

4. The sponge according to claim 3 in which each of said first foam layer and said second foam layer is polyurethane.

5. The sponge according to claim 2 in which said second layer has a double cell foam structure.

6. The sponge according to claim 1 in which said second layer has a reticulated double cell foam structure.

7. A multi-component sponge including:

a first foam layer having a reticulated single cell structure;

said first foam layer having a pair of substantially parallel sides;

said first foam layer having:
- a second layer adhered to one of said sides so that liquid can flow between said first foam layer and said second layer;
- and a third layer adhered to the other of said sides so that liquid can flow between said first foam layer and said third layer;
- each of said second layer and said third layer having an open cell structure;
- said first foam layer having a greater porosity than each of said second layer and said third layer;
- and said first foam layer having a porosity in the range of 3–15 pores per inch.

8. The sponge according to claim 7 in which said first foam layer has a porosity in the range of 6–10 pores per inch.

9. The sponge according to claim 8, in which each of said second layer and said third layer has a reticulated double cell foam structure.

10. The sponge according to claim 9 in which each of said first foam layer, said second foam layer, and said third foam layer is polyurethane.

11. The sponge according to claim 8 in which each of said second layer and said third layer has a reticulated single cell structure having a porosity in the range of 3–110 pores per inch.

12. The sponge according to claim 8 in which each of said second layer and said third layer has a double cell foam structure.

13. The sponge according to claim 7 in which each of said second layer and said third layer has a reticulated double cell foam structure.

14. A multi-component sponge including:

a first foam layer having a reticulated single cell structure;

a second layer adhered to said first foam layer so that liquid can flow between said first foam layer and said second layer;

said second layer having an open cell structure and being homogenous;

and said first foam layer having a porosity in the range of 3–30 pores per inch and a greater porosity than said second layer.

15. A multi-component sponge including:

a first foam layer having a reticulated single cell structure;

a second layer adhered to said first foam layer so that liquid can flow between said first foam layer and said second layer;

said second layer having an open cell structure and a substantially constant porosity;

and said first foam layer having a porosity in the range of 3–30 pores per inch and a greater porosity than said second layer.

16. A multi-component sponge including:

a first foam layer having a reticulated single cell structure;

said first foam layer having a pair of substantially parallel sides;

said first foam layer having;
- a second layer adhered to one of said sides so that liquid can flow between said first foam layer and said second layer;
- and a third layer adhered to the other of said sides so that liquid can flow between said first foam layer and said third layer;

each of said second and third layers having an open cell structure and being homogenous;

and said first foam layer having a greater porosity than each of said second and third layers.

17. A multi-component sponge including:

a first foam layer having a reticulated single cell structure;

said first foam layer having a pair of substantially parallel sides;

said first foam layer having:
- a second layer adhered to one of said sides so that liquid can flow between said first foam layer and said second layer;
- and a third layer adhered to the other of said sides so that liquid can flow between said first foam layer and said third layer;

each of said second and third layers having an open cell structure and a substantially constant porosity;

and said first foam layer having a greater porosity than each of said second and third layers.

* * * * *

UNITED STATES PATENT AND TRADEMARK OFFICE
CERTIFICATE OF CORRECTION

PATENT NO.   :  5,640,737
DATED        :  June 24, 1997
INVENTOR(S) :  John W. BOggs It is certified that error appears in the above-identified patent and that said Letters Patent is hereby corrected as shown below:

Column 1, line 4,   before "a" insert --- to ---

Column 3, line 26   should read:

--- each of the two foam layers 14 and 15.

Preferably, an ---
Column 5, line 21, cancel "the comma (,)"

Signed and Sealed this

Seventh Day of October, 1997

Attest:

BRUCE LEHMAN

*Attesting Officer*      *Commissioner of Patents and Trademarks*